2,866,767

COMPOSITION CONTAINING COPOLYMER OF ETHYLENICALLY UNSATURATED COMPOUNDS AND A DIGLYCIDYL ESTER OF A DICARBOXYLIC ACID AND PROCESS OF MAKING SAME

James C. Fang, Sharon Hill, Pa., assignor to E. I. du Pont de Nemours and Company, Wilmington, Del., a corporation of Delaware No Drawing. Application July 20, 1955
Serial No. 523,370

13 Claims. (Cl. 260—30.4)

This invention relates to organic coating compositions, particularly liquid coating compositions containing soluble organic film-forming polymers which are capable of being crosslinked to an insoluble state.

Organic coatings which are hard, adherent and flexible and which are not easily harmed by water, soap, grease, light and prolonged heat are very desirable for protecting and decorating a wide variety of articles such as automobile bodies, refrigerators, washing machines, kitchen cabinets and food mixers.

It is the principal object of this invention to provide new liquid organic coating compositions which can be applied as thin coatings to articles like those just mentioned and which provide, when dry, the previously described desirable properties.

A further object is to provide articles, particularly metal articles, coated with these new coating compositions.

These objects are accomplished by providing a liquid coating composition comprising (1) a copolymer of (a) an ethylenically unsaturated compound of the class consisting of styrene and methyl methacrylate and (b) an ethylenically unsaturated compound of the class consisting of acrylic acid and methacrylic acid, (2) a diglycidyl ester of a saturated straight chain aliphatic dicarboxylic acid containing 5–10 carbon atoms per molecule, and (3) volatile organic solvent for said copolymer and said diglycidyl ester, the molar ratio of (a) to (b) in said copolymer being between 7:1 and 2.5:1, and said diglycidyl ester being present in the amount of 0.3–1.0 mol per mol of (b).

The coated articles of this invention are prepared by spraying, dipping or otherwise applying a liquid coating composition of this invention on the surface of the article being coated and heating to bake or cure the coating. The article can be bare or primed with a suitable primer. The thickness of the coatings of this invention is usually of the order of 0.5–3.0 mils.

The following examples illustrate the principles and practice of this invention, but it is not intended to be limited thereby. Unless otherwise indicated, the parts and percentages are by weight.

EXAMPLE 1

*Preparation of styrene/acrylic acid copolymer (molar ratio 6:1)*

| | Grams |
|---|---|
| First portion: | |
| Xylene | 1607 |
| Butanol | 176 |
| Second portion: | |
| Styrene | 790 |
| Acrylic acid | 90 |
| Di-tertiarybutyl peroxide | 15 |
| Third portion: Di-tertiarybutyl peroxide | 5 |

The first portion ingredients were placed in a 3-neck five liter flask equipped with a stirrer, thermometer, nitrogen inlet, dropping funnel and reflux condenser and were heated to reflux temperature in a nitrogen atmosphere. A mixture of the second portion ingredients was added dropwise through the dropping funnel during the ensuing 2 hours while the charge was maintained at reflux temperature, about 120°–125° C., in a nitrogen atmosphere. Refluxing was continued under these conditions for an additional 4 hours, when the charge was allowed to cool to room temperature. About 60 hours later, the third portion was added, and the charge was refluxed in a nitrogen atmosphere for 4 hours. The charge was then cooled to room temperature. The resulting clear solution contained 32.4% by weight of a styrene/acrylic acid copolymer (molar ratio 6:1) and had a Gardner-Holdt viscosity of H at 25° C. The copolymer (substantially freed of solvent) had a relative viscosity of about 1.08, which is the value of the fraction (A) Efflux time of copolymer solution
(B) Efflux time of solvent used in copolymer solution The efflux time was measured in accordance with the procedure of ASTM–D–445–46T Method B using, as the "oil" mentioned in said procedure, (A) a solution of copolymer in dimethyl formamide containing 0.5 gram of copolymer per 100 cc. of solution, and (B) a sample of the dimethyl formamide used in making said solution, respectively. The determinations were run at 25° C. in a modified Ostwald viscosimeter, series 100.

*Preparation of diglycidyl azelate*

Diglycidyl azelate, diglycidyl adipate and diglycidyl esters of other saturated straight chain aliphatic dicarboxylic acids containing 5–10 carbon atoms per molecule can be made by condensing the sodium salt of the appropriate acid with an excess of epichlorohydrin, or by condensing the appropriate acid with an excess of epichlorohydrin in the presence of an excess of sodium hydroxide, and refining to remove sodium chloride and unreacted epichlorohydrin. Such esters can also be made from glycidol and the corresponding acyl chlorides.

*Preparation of liquid coating composition*

A liquid coating composition of this invention was prepared by grinding the following charge in conventional paint grinding apparatus until a smooth dispersion was produced:

| | Grams |
|---|---|
| Styrene/acrylic acid copolymer solution produced above | 540.0 |
| Diglycidyl azelate (87.5%) | 51.7 |
| Titanium dioxide pigment | 79.3 |
| Xylene | 54.1 |
| Butanol | 4.3 |

Since the copolymer solution contained about 17.9 grams (0.248 mol) of polymerized acrylic acid, the diglycidyl azelate (0.15 mol) was present in the amount of about 0.61 mol per mol of acrylic acid.

500 grams of this liquid coating composition were thinned to spraying viscosity with about 173 grams of xylene and 19 grams of butanol. 3 grams of "Arquad"-12 catalyst (50% solution of lauryl trimethylammonium chloride in isopropanol) were added and mixed in. The resulting composition was sprayed on both bare and primed steel panels in an amount sufficient to yield dry coatings about 2.0–2.5 mils thick. The coated panels were baked for 30 minutes at 250° F. The resulting white coatings were smooth, glossy, hard, adherent, flexible and resistant to water, gasoline, soap, grease, and salt solution. They were insoluble in organic compounds which dissolve the starting copolymer, e. g. methyl ethyl ketone, and a mixture of xylene and butanol (90/10). Outdoor exposure proved that the coatings were durable. This combination of properties makes the product of this example useful as a protective and decorative coating for such articles as automobile bodies, refrigerators and the like.

EXAMPLE 2

*Preparation of styrene/acrylic acid copolymer (molar ratio 6:1)*

A styrene/acrylic acid copolymer was prepared by placing the following ingredients in a bottle, tightly capping it and tumbling it for 16 hours in a water bath at 85° C.

| | Grams |
|---|---|
| Styrene | 62.4 |
| Acrylic acid | 7.2 |
| Carbon tetrabromide | 1.0 |
| Benzoyl peroxide | 2.8 |
| Xylene | 67.0 |
| Butanol | 8.0 |

The resulting clear solution contained 45.6% by weight of copolymer (indicating about 92% polymerization) and had a Gardner-Holdt viscosity of V. The copolymer had a relative viscosity of about 1.05, as measured by the method described in Example 1.

*Preparation of liquid coating composition*

A liquid coating composition of this invention having the following formula was prepared as in Example 1:

| | Grams |
|---|---|
| Styrene/acrylic acid copolymer produced above | 106.9 |
| Diglycidyl azelate (83.5%) | 15.4 |
| Xylene | 10.0 |
| Butanol | 1.1 |
| Titanium dioxide pigment | 51.3 |

Since the copolymer solution contained about 5.05 grams (0.07 mol) of polymerized acrylic acid, the diglycidyl azelate (0.043 mol) was present in the amount of 0.61 mol per mol of acrylic acid.

EXAMPLE 3

*Preparation of styrene/methacrylic acid copolymer (6:1 molar ratio)*

| | Grams |
|---|---|
| First portion: | |
| Styrene | 200.0 |
| Methyl isobutyl ketone | 228.0 |
| Second portion: | |
| Methacrylic acid | 27.8 |
| Di-tertiarybutyl peroxide | 4.0 |
| Third portion: Methyl isobutyl ketone | 460.0 |

The first portion ingredients were placed in reaction apparatus like that described in Example 1 and were heated to reflux temperature in a nitrogen atmosphere. A mixture of the second portion ingredients was added dropwise through the dropping funnel during the ensuing 90 minutes while the charge was maintained at reflux temperature, about 115°–120° C., in a nitrogen atmosphere. Refluxing was continued under these conditions for an additional 4 hours. The charge was then cooled to room temperature and was finally diluted to about 25% solids content by weight by adding the third portion. The resulting copolymer had a relative viscosity of about 1.1, as measured by the method described in Example 1.

*Preparation of liquid coating composition*

The following ingredients were mixed together:

| | Grams |
|---|---|
| Styrene/methacrylic acid copolymer solution prepared above | 200.0 |
| Diglycidyl azelate | 17.1 |

Since the copolymer solution contained about 6.1 grams (0.071 mol) of polymerized methacrylic acid, the diglycidyl azelate (0.057 mol) was present in the amount of 0.8 mol per mol of methacrylic acid.

The liquid coating composition prepared above was useful as a clear unpigmented coating composition without further treatments or ingredients. It was applied to bonderited steel panels, some of which were baked for 30 minutes and some for 60 minutes at 350° F. The resulting coatings were clear and they possessed properties similar to those described for the product of Example 1.

EXAMPLE 4

The following methyl methacrylate/acrylic acid copolymer solution can be substituted for the corresponding solution in the other examples, on the basis of an equal weight of copolymer with the indicated molar proportion of diglycidyl ester, additional solvent being added if desirable. Coatings of the resulting compositions have properties substantially equal to those of the previously described products.

*Preparation of methyl methacrylate/acrylic acid copolymer (molar ratio 2.7:1)*

| | Grams |
|---|---|
| First portion: Methyl isobutyl ketone | 386.0 |
| Second portion: | |
| Methyl methacrylate | 309.0 |
| Acrylic acid | 82.5 |
| Benzoyl peroxide | 4.5 |
| Water | 0.5 |

The first portion was placed in a 2-liter three neck flask equipped as described in Example 1, and was heated to reflux temperature in a nitrogen atmosphere. A mixture of the second portion ingredients was prepared and added in four aliquots at half-hour intervals while the charge was maintained at reflux temperature, about 115°–120° C., in a nitrogen atmosphere. Refluxing was continued under these conditions for 4 hours after the last aliquot was added. The charge was then cooled to room temperature. The resulting copolymer had a relative viscosity of about 1.09, as measured by the method described in Example 1. The solution contained 50.3% solids by weight and had a Gardner-Holdt viscosity greater than Z–6.

EXAMPLE 5

A clear coating composition of this invention was prepared by mixing the following ingredients together:

| | Grams |
|---|---|
| Styrene/acrylic acid copolymer solution prepared in Example 1 | 54.0 |
| Diglycidyl adipate | 3.9 |

Since the copolymer solution contained about 1.8 grams (0.025 mol) of polymerized acrylic acid, the diglycidyl adipate (0.015 mol) was present in the amount of about 0.6 mol per mol of acrylic acid.

Clear coatings of the product of this example, baked for 30 minutes at 350° F., were smooth, hard, adherent and resistant to water, soap, toluene and salt solution. They were somewhat less flexible than analogous coatings made with diglycidyl azelate in place of the diglycidyl adipate.

EXAMPLE 6

*Preparation of styrene/acrylic acid copolymer (molar ratio 4.5:1)*

A styrene/acrylic acid copolymer was prepared as in Example 1 except that the following charge was used:

| | Grams |
|---|---|
| First portion: | |
| Butanol | 284.1 |
| Xylene | 1608.9 |
| Second portion: | |
| Styrene | 703.5 |
| Acrylic acid | 108.0 |
| Di-tertiarybutyl peroxide | 15.0 |
| Third portion: Di-tertiarybutyl peroxide | 5.0 |

The resulting clear solution contained 28.7% by weight of copolymer and had a Gardner-Holdt viscosity of E. The copolymer had a relative viscosity of about 1.09, as measured by the method described in Example 1.

*Preparation of liquid coating composition*

A liquid coating composition of this invention having the following formula was prepared as in Example 1:

| | Grams |
|---|---|
| Styrene/acrylic acid copolymer solution prepared above | 174.2 |
| Diglycidyl azelate (83.5%) | 13.3 |
| Titanium dioxide pigment | 22.2 |
| Xylene | 16.0 |
| Butanol | 3.0 |

Since the copolymer solution contained about 7.6 grams (0.105 mol) of polymerized acrylic acid, the diglycidyl azelate (0.037 mol) was present in the amount of about 0.4 mol per mol of acrylic acid.

When used in the manner described in Example 1, the product of this example had properties similar to the product of that example and was useful for the same purposes.

The foregoing examples illustrate a wide variety of specific embodiments of this invention. The use of equivalent ingredients in other embodiments will be obvious to persons skilled in the copolymer and coating composition arts, such as the following, all of which can be used in place of all or part of the corresponding materials in the examples:

(1) Copolymers of (a) styrene or methyl methacrylate and (b) acrylic acid or methacrylic acid in which the molar ratio of a:b is between 7:1 and 2.5:1. The preferred copolymers have a ratio of a:b in the range of 6:1 to 4.5:1 and a relative viscosity of about 1.05–1.1 as measured by the method described in Example 1. Minor amounts of other polymerizable monomers which are innocuous in the functioning of these copolymers can be added in preparing the copolymers. The preferred copolymers are copolymers of styrene and acrylic acid.

(2) Other well-known polymerization catalysts such as alpha, alpha' azodiisobutyronitrile and tertiarybutyl hydroperoxide.

(3) Other diglycidyl esters, specifically diglycidyl glutarate, diglycidyl pimelate, diglycidyl suberate and diglycidyl sebacate, used in the amount of 0.3–1.0 mol per mol of acrylic acid or methacrylic acid present in the copolymer. The preferred amount of diglycidyl ester is 0.4–0.6 mol per mol of said acid, and the preferred diglycidyl esters are the azelate and the adipate.

(4) Other baking, cross-linking or curing catalysts when desirable or necessary for insolubilizing the coating compositions such as para-toluene sulfonic acid, triphenyl phosphine, and quaternary ammonium salts having both lower ($C_1$–$C_2$) and higher ($C_{10}$–$C_{18}$) alkyl substituents.

(5) Other volatile organic solvents for the copolymer/diglycidyl ester mixtures, such as esters, ketones, and mixtures of aromatic hydrocarbons with $C_1$–$C_6$ aliphatic monohydric alcohols.

(6) Other pigments commonly used in organic coating compositions, such as carbon blacks, phthalocyanine blues and greens, organic maroons, and metal oxides, hydroxides, silicates, sulfates, sulfides, and chromates. The preferred pigments are resistant to reaction in the presence of the acidic copolymers.

Well-known additives for coating compositions can be incorporated in the products of this invention, when desirable, such as surface active agents, flow and viscosity control agents, and pigment dispersing agents.

Although the examples describe the use of the coating compositions of this invention on steel, they can be used on other substrates which are not adversely affected by the baking operations, including other metals (e. g. aluminum, copper, magnesium, and alloys thereof), glass, ceramics, asbestos, and (when moderate baking conditions are permissible) wood. The preferred baking schedules vary from 30 minutes at 250° F. to 5 minutes at 500° F. depending on the substrate, the degree of curing required and whether a baking catalyst is used. When desirable, the coating compositions of this invention can be used under superposed coatings of one or more coating compositions of similar or different character.

The products of this invention are most useful for preparing baked coatings on steel articles, such as refrigerators, washing machines, kitchen cabinets, and automobile bodies.

It is apparent that many widely different embodiments of this invention can be made without departing from the spirit and scope thereof; and, therefore, it is not intended to be limited except as indicated in the appended claims.

I claim:

1. A liquid coating composition comprising (1) a copolymer of (a) an ethylenically unsaturated compound of the class consisting of styrene and methyl methacrylate and (b) an ethylenically unsaturated compound of the class consisting of acrylic acid and methacrylic acid, (2) a diglycidyl ester of a saturated straight chain aliphatic dicarboxylic acid containing 5–10 carbon atoms per molecule, and (3) volatile organic solvent for said copolymer and said diglycidyl ester, the molar ratio of (a) to (b) in said copolymer being between 7:1 and 2.5:1, and said diglycidyl ester being present in the amount of 0.3–1.0 mol per mol of (b).

2. A composition of claim 1 in which the molar ratio of (a) to (b) is between 6:1 and 4.5:1.

3. A composition of claim 1 in which the copolymer is a copolymer of (a) styrene and (b) acrylic acid.

4. A composition of claim 1 in which the copolymer is a copolymer of (a) styrene and (b) methacrylic acid.

5. A composition of claim 1 in which the copolymer is a copolymer of (a) methyl methacrylate and (b) acrylic acid.

6. A composition of claim 1 in which the copolymer has a relative viscosity of about 1.05–1.1, relative viscosity being the value of the fraction $A/B$ where A is the efflux time of a solution of said copolymer in dimethyl formamide containing 0.5 gram of said copolymer per 100 cc. of solution and B is the efflux time of the dimethyl formamide used in making said solution, the efflux times being determined at 25° C. in a modified Ostwald viscosimeter series 100.

7. A composition of claim 1 in which the diglycidyl ester is present in the amount of 0.4–0.6 mol per mol of (b).

8. A composition of claim 1 in which the diglycidyl ester is diglycidyl azelate.

9. A composition of claim 1 in which the diglycidyl ester is diglycidyl adipate.

10. An article having a baked coating of a composition of claim 1, said baked coating being the product of heating a liquid coating of a composition of claim 1 for 5–60 minutes at 250°–500° F.

11. A composition of claim 1 further containing pigment.

12. An article having a baked coating of a composition of claim 11, said baked coating being the product of heating a liquid coating of a composition of claim 11 for 5–60 minutes at 250°–500° F.

13. The process of cross-linking a copolymer of (a) an ethylenically unsaturated compound of the class consisting of styrene and methyl methacrylate and (b) an ethylenically unsaturated compound of the class consisting of acrylic acid and methacrylic acid, which process comprises heating said copolymer for 5–60 minutes at 250°–500° F. in the presence of 0.3–1.0 mol, per mol of (b), of a diglycidyl ester of a saturated straight chain aliphatic dicarboxylic acid containing 5–10 carbon atoms per molecule.

References Cited in the file of this patent

UNITED STATES PATENTS

| | | |
|---|---|---|
| 2,200,429 | Perrin et al. | May 14, 1940 |
| 2,448,602 | Kester et al. | Sept. 7, 1948 |
| 2,604,464 | Segall et al. | July 22, 1952 |